Patented Sept. 10, 1946

2,407,472

UNITED STATES PATENT OFFICE 2,407,472

PROCESS FOR PREPARATION OF UNSATURATED NITRILES

Darrel J. Butterbaugh, Philadelphia, and Le Roy U. Spence, Elkins Park, Pa., assignors to Röhm & Haas Company, Philadelphia, Pa., a corporation of Delaware No Drawing. Application June 20, 1944, Serial No. 541,272

11 Claims. (Cl. 260—464)

This invention relates to a process of making unsaturated nitriles by the vapor phase reaction of methyl acetylene and/or allene with hydrogen cyanide in the presence of certain catalysts.

An object of this invention is to provide a commercially feasible method of making unsaturated nitriles from methyl acetylene and/or allene and hydrogen cyanide. A further object is to provide catalysts that promote the addition of one molecule of hydrogen cyanide to one molecule of methyl acetylene and/or allene to form a mixture of methacrylonitrile and cis- and trans-crotononitrile under conditions which do not substantially decompose either the methyl acetylene or allene or the hydrogen cyanide and which are unfavorable to side reactions.

We have found that a yield of the mixed nitriles of the order of 60% of the hydrogen cyanide used may be readily obtained by passing methyl acetylene and hydrogen cyanide in the vapor phase over catalysts containing certain metals of group II B of the periodic table. These catalysts comprise primarily compounds of cadmium, magnesium, and zinc, with particularly good results being obtained with compounds of zinc. The free metals may also be used. Various compounds of the metals capable of withstanding the temperatures employed may be used, including the oxides, hydroxides, and various salts, such as the ferrocyanides, phosphates, carbonates, cyanides, salts of organic acids such as the acetates, formates, butyrates, etc., various basic salts and zinc zeolite. Compounds which are somewhat basic in nature or which at least in part react with hydrogen cyanide to form metal cyanides have been found to be particularly good. The preferred temperatures for the reaction are higher than the melting points of zinc and cadmium and, hence, when these metals are used, it is necessary to support them on a carrier to prevent their flowing out of the catalyst tube. Alloys of any two or more of the metals, zinc, magnesium, and cadmium, may also be employed.

The catalysts may be prepared by methods well known in the art as, for instance, evaporating a solution of a soluble compound on an inert carrier, precipitating an insoluble compound on an inert carrier, or mixing an aqueous slurry of an insoluble compound or of the free metal with an inert carrier, filtering, pressing, and drying the filter cake, and finally grinding to the desired particle size. The inert carriers may be such materials as quartz, Filtros, diatomaceous earth, various clays, pumice, alumina, Carborundum, etc. In some instances, particularly in the case of metallic oxide, hydroxide, carbonate, and acetate catalysts, the activity is improved by passing hydrogen cyanide over them at temperatures above 150° C. This treatment to some extent forms the cyanide of the metal and may be used to produce a metal cyanide catalyst or a mixed catalyst of metal cyanide and metal oxide, hydroxide, carbonate, acetate, etc. While the best particle size of the catalyst will depend to some extent upon the construction of the catalyst tube, we have found most practical granules that will pass a four-mesh screen but not a ten-mesh one.

During the course of the reaction, some carbonaceous material is gradually deposited on the catalyst and reduces its activity. This deposit may, however, be removed and the activity restored by passing air, alone or diluted with nitrogen, carbon dioxide, or steam over the catalyst at 400° to 600° C. To allow for this reactivation, it is desirable to provide the plant for carrying out the reaction with two converters connected in parallel so that the catalyst in one converter may be reactivated while the other converter is being used. To restore full activity to the reactivated catalyst, it is sometimes necessary to pass hydrogen cyanide over the catalyst at temperatures above 150° C., the same as in the case of the freshly prepared catalyst.

The reaction may be carried out by passing a mixture of methyl acetylene and/or allene and hydrogen cyanide in vapor phase over the catalyst in a tube provided with a surrounding heat exchange medium. The reaction mixture may contain an equimolar ratio of methyl acetylene and/or allene and hydrogen cyanide, or one of the reactants may be present in excess. For economical reasons, we prefer to use an excess of methyl acetylene, as the percentage yield of methacrylonitrile based on the hydrogen cyanide is thereby increased. Any unreacted methyl acetylene and/or allene and hydrogen cyanide may be recirculated over the catalyst. The presence in the reaction mixture of small amounts of water vapor is beneficial in that it improves the per cent. yield somewhat and reduces the amount of deposit formed on the catalyst. Dilution of the reacting gases with nitrogen or other inert gases also has a beneficial effect.

A mixture of methyl acetylene and allene may be used with good results. Several methods for preparing these substances give mixtures of methyl acetylene and allene. The mixture as obtained may be used without need for further purification. The presence of other hydrocarbons, such as propane, propylene, or isobutylene, in moderate amounts does not interfere with the reaction. Acetylene, if present, is converted to acrylonitrile, which may be separated in the final purification of the products.

At atmospheric pressures the reaction starts at a temperature of about 350° C. and may be carried out at temperatures up to 600° C. Preferably, the temperature is kept within the range of from 400° to 500° C. The reaction is exothermic and, hence, means must be provided for dissipating the heat of reaction as, for example, a molten salt bath, mercury bath, and similar devices known to the art. While we prefer to operate at atmospheric pressure, elevated pressures may be used if desired.

The rate of flow of reactants over the catalyst may be varied within wide limits. A space velocity (volumes of gas per volume of catalyst per hour) of 75 gives high yields of methacrylonitrile, and much lower velocities may be used. Higher velocities are preferred, however, as the deposit on the catalyst is thereby decreased.

In the following examples, which are given both to illustrate the practice of the invention and the results obtainable thereby, the hydrogen cyanide and methyl acetylene and/or allene were mixed, passed through a steam jacketed preheater tube and then through a catalyst tube ½ to ¾ of an inch in diameter and twenty-five inches long. The gases were passed through the reaction tube at a rate of two gram mols per hour. The exit gases were first passed through a condenser in which they were cooled to from 0° to −10° C. to condense the liquid products and then through a hydrogen cyanide absorber in which any uncondensed hydrogen cyanide was recovered. The gases leaving the hydrogen cyanide absorber were passed through a calcium chloride drying tube and then into a Dry Ice-acetone cooled trap, where practically all of the exit gases were condensed. The unreacted methyl acetylene and allene thus recovered can be used for the production of further quantities of unsaturated nitriles. The liquid products of the reaction were distilled through a fractionating column, first separating unchanged hydrogen cyanide which was absorbed, and then separating the unsaturated nitrile fractions.

*Example 1*

The catalyst, consisting of 25% active ingredient supported on Superfloss, was prepared by dissolving 0.62 mol of zinc nitrate in two liters of distilled water. After suspending 150 grams of Superfloss, which is a commercially available diatomaceous earth, in this nitrate solution, zinc hydroxide was precipitated by the gradual addition of the theoretical quantity of dilute ammonium hydroxide. The resulting suspension was filtered, the cake washed until free of nitrates, and dried in an oven. This dried catalyst cake was then reduced to 4 to 10 mesh particle size and ignited in air at 400° to 425° C. About 200 cc. of catalyst was charged to the tubular reactor.

Prior to the run, a mixture of nitrogen gas and hydrogen cyanide was passed through the catalyst zone at 420° to 425° C. Hydrogen cyanide consumption indicated that about 20% of the zinc oxide in the catalyst had reacted. After this hydrogen cyanide pretreatment, the catalyst tube was swept with a stream of nitrogen to remove any unreacted hydrogen cyanide.

Passage of a gas mixture consisting of 50% hydrogen cyanide and 50% methyl acetylene (containing about 5% allene) at a temperature of 425° C. and a space velocity of 200 resulted in a 55% yield and 20% conversion to mixed unsaturated nitriles. Approximately 36% of the hydrogen cyanide was consumed per pass. Fractional distillation of the unsaturated nitrile mixture indicated it to be 50% to 55% methacrylonitrile, 25% cis-crotononitrile, 15% trans-crotononitrile and/or allyl cyanide, and 5% higher boiling products.

*Example 2*

Another run similar to that described in Example 1, except that 10% excess methyl acetylene and a reactor temperature of 450° C were used, gave a 56.5% yield and a 21% conversion of unsaturated nitriles. Hydrogen cyanide consumption was 37% per pass.

*Example 3*

Passage of hydrogen cyanide and a gas mixture containing 70% to 80% of allene and 20% to 30% of methyl acetylene and propylene over a zinc oxide catalyst gave a 30.5% yield of unsaturated nitrile based on the hydrogen cyanide consumed. At 450° C. and a space velocity of 200, the conversion per pass was 8.5%.

In the foregoing examples, there has been used for purposes of illustration catalyst made from a single active metal, and a commercially available diatomaceous earth has been used as the inert carrier. Mixtures of zinc catalysts with either cadmium or magnesium catalysts or mixtures of the latter two may also be used with equally good results. Magnesium oxide may, for example, be mixed with the carrier and a zinc salt deposited on the mixture whereby there is obtained in the catalyst a degree of alkalinity which is desirable. Complex salts such as a basic zinc magnesium phosphate may likewise be used. In place of the Superfloss used in the examples, various other inert carriers may be used as, for instance, quartz particles or pumice may be impregnated with a solution of zinc, cadmium, and/or magnesium compound, and either evaporated to dryness or treated to precipitate an insoluble compound.

Various other methods for recovering and separating the reaction products and the unreacted methyl acetylene and/or allene and hydrogen cyanide may also be practiced. The heat in the reaction products leaving the catalyst tube may, for instance, be used to heat the incoming gases, thereafter the reaction gases are cooled to approximately 20° to 30° C. to condense the high-boiling liquids, and the remaining methacrylonitrile separated by scrubbing with a solvent or by means of an absorbent such as activated charcoal. The methacrylonitrile or mixture of unsaturated nitriles and the absorbed hydrogen cyanide may then be recovered by distilling them from the solvent or by passing steam through the solid absorbent, condensing and distilling from the condensate first the hydrogen cyanide, which may be recirculated, and then a constant boiling mixture of unsaturated nitriles and water (boiling point, 69° to 70° C.). This mixture separates into layers on being condensed.

The residue of higher-boiling reaction products from which the mixture of unsaturated nitriles was distilled in the practice of the invention, as described in the examples, or which is initially condensed in the alternative procedure described in the preceding paragraph, contains small but appreciable amounts of unsaturated nitriles. This may be recovered by adding water to the residue and distilling out the constant-boiling unsaturated nitriles-water mixture.

We claim:

1. The process of making a mixture of unsaturated nitriles which comprises reacting a member of the group consisting of methyl acetylene and allene with hydrogen cyanide in vapor phase in the presence of a catalytic agent containing a metal from the group consisting of cadmium, magnesium, and zinc, under temperature and pressure conditions such that the reaction will take place.

2. The process of making a mixture of unsaturated nitriles which comprises reacting a member of the group consisting of methyl acetylene and allene with hydrogen cyanide in vapor phase in the presence of a small amount of water vapor and a catalytic agent containing a metal from the group consisting of cadmium, magnesium, and zinc, under temperature and pressure conditions such that the reaction will take place.

3. The process of making a mixture of unsaturated nitriles which comprises reacting a member of the group consisting of methyl acetylene and allene with hydrogen cyanide in vapor phase in the presence of a catalytic agent of alkaline reaction containing a metal from the group consisting of cadmium, magnesium, and zinc, under temperature and pressure conditions such that the reaction will take place.

4. The process of making a mixture of unsaturated nitriles which comprises reacting a member of the group consisting of methyl acetylene and allene with hydrogen cyanide at a temperature of from 350° to 600° C. in the presence of a catalytic agent containing a metal from the group consisting of cadmium, magnesium, and zinc.

5. The process of making a mixture of unsaturated nitriles which comprises reacting a member of the group consisting of methyl acetylene and allene with hydrogen cyanide at a temperature of from 350° to 600° C. in the presence of a small amount of water vapor and a catalytic agent containing a metal from the group consisting of cadmium, magnesium, and zinc.

6. The process of making a mixture of unsaturated nitriles which comprises reacting a member of the group consisting of methyl acetylene and allene with hydrogen cyanide in the presence of a catalytic agent containing zinc, under temperature and pressure conditions such that the reaction will take place.

7. The process of making a mixture of unsaturated nitriles which comprises reacting a member of the group consisting of methyl acetylene and allene with hydrogen cyanide in the presence of a catalytic agent containing zinc at a temperature of from 350° to 600° C.

8. The process of making a mixture of unsaturated nitriles which comprises passing a mixture of gases containing methyl acetylene, hydrogen cyanide, and a small amount of water vapor over a catalytic agent containing zinc at a temperature of from 350° to 600° C.

9. The process of making a mixture of unsaturated nitriles which comprises reacting, under temperature and pressure conditions such that the reaction will take place, a member of the group consisting of methyl acetylene and allene with hydrogen cyanide in the presence of a catalytic agent resulting from the reaction of hydrogen cyanide at temperatures above 150° C. with a zinc compound.

10. The process of making a mixture of unsaturated nitriles which comprises reacting, under temperature and pressure conditions such that the reaction will take place, a member of the group consisting of methyl acetylene and allene with hydrogen cyanide in the presence of a catalytic agent containing zinc cyanide.

11. The process of making a mixture of unsaturated nitriles which comprises reacting a member of the group consisting of methyl acetylene and allene with hydrogen cyanide at a temperature of from 400° to 500° C. in the presence of a catalytic agent prepared by passing hydrogen cyanide over a zinc oxide catalyst at a temperature above 150° C.

DARREL J. BUTTERBAUGH.
LE ROY U. SPENCE.